(12) United States Patent
Song et al.

(10) Patent No.: US 11,038,241 B2
(45) Date of Patent: Jun. 15, 2021

(54) SEPARATOR AND LITHIUM-SULFUR BATTERY COMPRISING SAME

(71) Applicant: LG CHEM, LTD., Seoul (KR)

(72) Inventors: Jieun Song, Daejeon (KR); Kwonnam Sohn, Daejeon (KR); Doo Kyung Yang, Daejeon (KR); Yun Kyoung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 284 days.

(21) Appl. No.: 16/303,502

(22) PCT Filed: Dec. 21, 2017

(86) PCT No.: PCT/KR2017/015248
§ 371 (c)(1),
(2) Date: Nov. 20, 2018

(87) PCT Pub. No.: WO2018/124636
PCT Pub. Date: Jul. 5, 2018

(65) Prior Publication Data
US 2020/0328394 A1   Oct. 15, 2020

(30) Foreign Application Priority Data

Dec. 27, 2016 (KR) .................... 10-2016-0180436

(51) Int. Cl.
*H01M 2/14*     (2006.01)
*H01M 50/449*   (2021.01)
(Continued)

(52) U.S. Cl.
CPC ....... *H01M 50/449* (2021.01); *H01M 10/052* (2013.01); *H01M 50/411* (2021.01); *H01M 50/431* (2021.01)

(58) Field of Classification Search
CPC ............ H01M 2/1686; H01M 2/1646; H01M 2/1653; H01M 10/052; H01M 2/16; H01M 4/38; Y02E 60/10
See application file for complete search history.

(56) References Cited

U.S. PATENT DOCUMENTS

2012/0015232 A1   1/2012   Teshima et al.
2012/0202102 A1   8/2012   Kakibe et al.
(Continued)

FOREIGN PATENT DOCUMENTS

CN   104362394 A   2/2015
CN   104916803 A   9/2015
(Continued)

OTHER PUBLICATIONS

Machine translation of CN 104993083, retrieved from <www.espacenet.com> on Oct. 23, 2020.*
(Continued)

*Primary Examiner* — Cynthia K Walls
(74) *Attorney, Agent, or Firm* — Birch, Stewart, Kolasch & Birch, LLP (57) ABSTRACT

A separator capable of simultaneously solving the problems caused by lithium polysulfides and lithium dendrites generated in a conventional lithium-sulfur battery wherein the separator includes a porous substrate alternately laminated with a graphene oxide layer and a boron nitride layer on at least one side thereof, and to a lithium-sulfur battery including the same.

12 Claims, 3 Drawing Sheets

(51) Int. Cl.
*H01M 10/052* (2010.01)
*H01M 50/411* (2021.01)
*H01M 50/431* (2021.01)

(56) References Cited

U.S. PATENT DOCUMENTS

| | | |
|---|---|---|
| 2013/0285013 A1 | 10/2013 | An et al. |
| 2014/0008611 A1 | 1/2014 | Geim et al. |
| 2015/0176930 A1 | 6/2015 | Zhao et al. |
| 2016/0104876 A1 | 4/2016 | Avison et al. |
| 2016/0149184 A1 | 5/2016 | Nam et al. |

FOREIGN PATENT DOCUMENTS

| | | |
|---|---|---|
| CN | 104993083 A | 10/2015 |
| CN | 105970605 A | 9/2016 |
| CN | 106129455 A | 11/2016 |
| JP | 2009-9801 A | 1/2009 |
| JP | 2013-545299 A | 12/2013 |
| JP | 2015-122499 A | 7/2015 |
| JP | 2015-181110 A | 10/2015 |
| JP | 2016-517161 A | 6/2016 |
| KR | 10-2011-0083515 A | 7/2011 |
| KR | 10-1144817 B1 | 5/2012 |
| KR | 10-2014-0027962 A | 3/2014 |
| KR | 10-2015-0133343 A | 11/2015 |
| KR | 10-2016-0061165 A | 5/2016 |
| KR | 10-2016-0077529 A | 7/2016 |

OTHER PUBLICATIONS

Machine translation of CN 106129455, retrieved from <www.espacenet.com> on Oct. 23, 2020.*
Finegan (Characterising the structural properties of polymer separators for lithium-ion batteries in 3D using phase contrast X-ray microscopy, Journal of Power Sources, 2016, 333, pp. 184-192.*
European Office Action for European Application No. 17885964.1, dated Aug. 5, 2020.
Li et al., "Reduced Graphene Oxide/Boron Nitride Composite Film as a Novel Binder-Free Anode for Lithium Ion Batteries with Enhanced Performances", Electrochimica Acta, Elsevier, Amsterdam, NL, vol. 166, Mar. 17, 2015, pp. 197-305, XP029158220.
International Search Report for PCT/KR2017/015248 dated Apr. 6, 2018.

* cited by examiner

SEPARATOR AND LITHIUM-SULFUR BATTERY COMPRISING SAME

TECHNICAL FIELD

This application claims priority to and the benefit of Korean Patent Application No. 10-2016-0180436, filed on Dec. 27, 2016, the disclosure of which is incorporated herein by reference its entirety.

The present invention relates to a separator capable of simultaneously solving problems caused by lithium polysulfide and lithium dendrite, and a lithium-sulfur battery including the separator.

BACKGROUND ART

Recently, as the miniaturization and weight reduction of electronic products, electronic devices, communication devices and the like are rapidly progressing and the need for electric vehicles has been greatly increased in relation to environmental problems, there is a growing demand for performance improvements in secondary batteries used as energy sources for these products. Among them, the lithium secondary battery has been attracting considerable attention as a high-performance battery because of its high energy density and high standard electrode potential.

In particular, the lithium-sulfur (Li—S) battery is a secondary battery using a sulfur-based material having an S—S bond (sulfur-sulfur bond) as a positive electrode active material and using lithium metal as a negative electrode active material. Sulfur, which is the main material of the positive electrode active material, has advantages that it is very rich in resources, is not toxic, and has a low atomic weight. In addition, theoretical discharging capacity of the lithium-sulfur battery is 1675 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery is the most promising battery among the batteries developed so far.

During the discharging reaction of the lithium-sulfur battery, an oxidation reaction of lithium occurs at the negative electrode (Anode) and a reduction reaction of sulfur occurs at the positive electrode (Cathode). The lithium-sulfur battery generates lithium polysulfide (Li$_2$S$_x$, x=2 to 8) during the discharging, and the lithium polysulfide dissolves in the electrolyte and diffuses into the negative electrode, thereby causing various side reactions as well as reducing the capacity of the sulfur which is participated in the electrochemical reaction. Also, during the charging process, the lithium polysulfide causes a shuttle reaction, thereby significantly reducing the charging/discharging efficiency.

In order to solve the above problem, a method of adding an additive having a property of adsorbing sulfur has been proposed, but this method has caused a deterioration problem and thus newly generated an additional side reaction of the battery. Therefore, in order to delay leak of the positive electrode active material, i.e., sulfur, a method of adding metal chalcogenide or alumina or coating the surface with oxycarbonate or the like has been proposed. However, in the case of this method, not only the sulfur is lost during processing or the method is complicated, but also the amount of the active material, i.e., sulfur, that can be put in (i.e., the amount of loading) is limited.

Meanwhile, on the surface of the lithium negative electrode, which is a negative electrode in the lithium-sulfur battery, the lithium metal particles generated from precipitation and dissolution of lithium metal, and lithium sulfide are present in a mixed state. As a salt, the surface of the lithium negative electrode is changed to a porous structure, and some of it grows into dendrites and thus lithium dendrite occurs and grows.

Due to the porous structure and lithium dendrite thus formed, the loss of lithium metal is accelerated, and irreversible capacity is resulted, and thus the life of the lithium-sulfur battery is reduced. In addition, lithium dendrites have very high reactivity and consequently generate short circuit, heat, ignition and explosion of lithium-sulfur batteries and thus cause a serious problem in stability.

In order to solve this problem, a method of forming an additional coating layer such as a protective film on the electrode has been proposed. However, the protective film itself acts as a resistive layer and the path of the lithium ion in the electrolyte is lengthened or blocked, and thus the improvement effect of the battery performance cannot be ensured at a desired level.

Therefore, in order to commercialize the lithium-sulfur battery, the problem of the lithium polysulfides and lithium dendrites is the first challenge to be solved.

PRIOR ART LITERATURE

Patent Literature

Korean Patent Publication No. 2015-0133343 (Nov. 30, 2015), Positive electrode for lithium sulfur battery and lithium sulfur battery including the same.

DISCLOSURE

Technical Problem

Accordingly, in order to solve the problems of the lithium polysulfides generated on the positive electrode side of the lithium-sulfur battery and the lithium dendrites generated on the negative electrode side, and thus as a result of applying a new structure employing graphene oxides and boron nitrides to the separator in contact with those, it has been confirmed by the present invention that the above problems can be solved at the same time to improve the battery performance of the lithium-sulfur battery, thereby completing the present invention.

Accordingly, it is an object of the present invention to provide a separator for a lithium-sulfur battery, which is capable of simultaneously solving problems caused by lithium polysulfide and lithium dendrite.

In addition, it is another object of the present invention to provide a lithium-sulfur battery with improved battery performance comprising the separator.

Technical Solution

In order to achieve the above object, the present invention provides a separator for a lithium-sulfur battery comprising a porous substrate and a multi-layered coating layer formed on at least one side of the porous substrate, wherein the multi-layered coating layer is formed by alternately laminating a graphene oxide layer and a boron nitride layer.

In addition, the present invention provides a lithium-sulfur battery comprising the separator.

Advantageous Effects

The separator according to the present invention simultaneously solves the problems caused by the lithium polysulfide and lithium dendrite generated respectively in the positive and negative electrodes of the lithium-sulfur battery by comprising the multi-layered coating layer formed by alternately laminating the graphene oxide layer and the boron nitride layer.

In case of the lithium-sulfur battery provided with the above separator, not only is it possible to realize a high-capacity battery because the capacity of sulfur is not lowered, and to stably apply sulfur by high loading, but also there is no problem such as short-circuiting or heat generation of the battery, thereby improving stability of the battery. In addition, this lithium-sulfur battery has an advantage that the charging and discharging efficiency of the battery is high and the life characteristic is improved.

BEST MODE

The present invention provides a lithium-sulfur battery and a separator used therefor.

Figure 1:
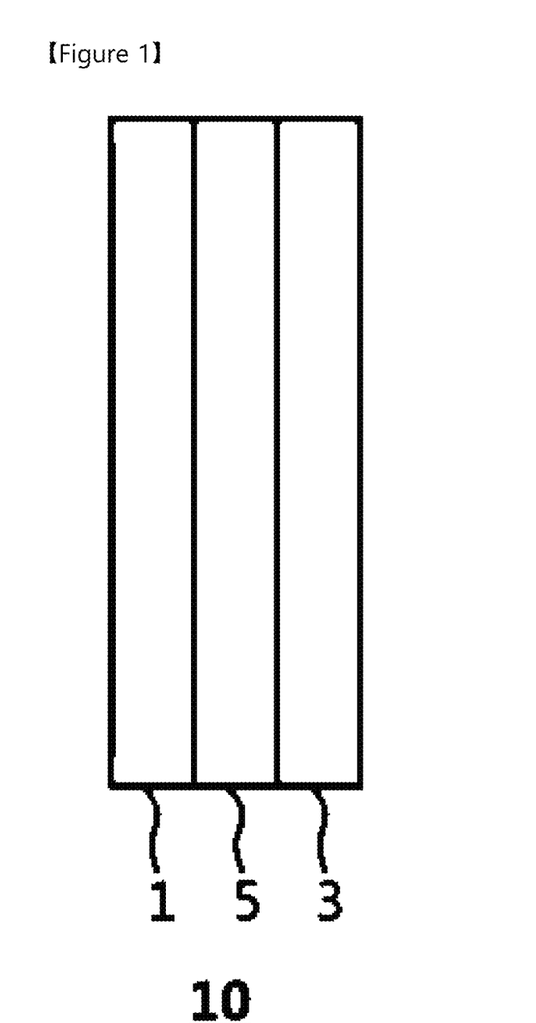
FIG. 1 is a cross-sectional view illustrating the lithium-sulfur battery according to an embodiment of the present invention.

FIG. 1 is a cross-sectional view showing a lithium-sulfur battery 10 which comprises lithium metal as a negative electrode 1, sulfur as a positive electrode 3, and a separator 5 disposed therebetween. In that case, the electrolyte (not shown) exists between the negative electrode 1 and the positive electrode 3 and is in a form impregnated with a separator 5.

During the charging and discharging of the lithium-sulfur battery 10, lithium polysulfides are formed on the positive electrode and thus the charging capacity of the battery 10 is reduced and the energy is decreased, and at the same time, lithium dendrites are generated on the negative electrode 1 and thus a problem of stability such as short circuit, heat generation, ignition and explosion of the battery occurs along with the reduction in life of the battery. In order to solve these problems, a method of adding a new composition to the electrode or forming an additional coating layer thereon has been proposed, but the effect of improving the performance of the battery to a desired level cannot be ensured.

Accordingly, the present invention proposes a separator 5 having a new structure to solve these problems at the same time.

Specifically, the separator 5 according to the present invention has a porous substrate and a multi-layered coating layer formed on one or both sides of the porous substrate. When the multi-layered coating layer is formed on one side of the porous substrate, the multi-layered coating layer may be located anywhere on the side of negative electrode 1 or the side of positive electrode 3, and is not particularly limited in the present invention.

The porous substrate constituting the separator 5 enables the transport of lithium ions between the negative electrode 1 and the positive electrode 3 while separating or insulating the negative electrode 1 and the positive electrode 3 from each other. The separator 5 may be made of a porous, nonconductive or insulating material. The separator 5 may be an independent member such as a film.

Specifically, the porous substrate may be a porous polymer film alone or a laminate of porous polymeric films, or may be a conventional porous nonwoven fabric, for example, non-woven fabric made of glass fiber or polyethyleneterephthalate fiber with high melting point, etc., but is not limited thereto.

The material of the porous substrate is not limited in the present invention, but may be a material commonly used in this field. Typically, the material may be any one selected from the group consisting of polyolefins such as polyethylene and polypropylene, etc., polyesters such as polyethyleneterephthalate and polybutyleneterephthalate, etc., polyamides such as aramid, polyacetal, polycarbonate, polyimide, polyether ketone, polyethersulfone, polyphenylene oxide, polyphenylenesulfide, polyethylene naphthalene, polytetrafluoroethylene, polyvinylidene fluoride, polyvinylchloride, polyacrylonitrile, cellulose, nylon, polyparaphenylene benzobisoxazole and polyarylate, or a mixture of two or more thereof.

The thickness of the porous substrate may be 3 μm to 100 μm, or 3 μm to 50 μm. Although the range of the porous substrate is not particularly limited to the above-mentioned range, if the thickness is excessively thinner than the lower limit described above, mechanical properties are deteriorated and separator 5 may be easily damaged during use of the battery. On the other hand, the pore size and porosity present in the porous substrate are also not particularly limited, but may be 0.1 μm to 10 μm and 25% to 85%, respectively.

The multi-layered coating layer formed on at least one side of the porous substrate plays a role in simultaneously solving the problems caused by the lithium polysulfide and lithium dendrite, and simultaneously contains the graphene oxide layer and the boron nitride layer for these purposes.

Graphene oxide is an oxide of graphene, called graphitic oxide, and its structure has not yet been clearly identified. Graphene itself has a high electrical conductivity, and thus it is difficult, due to this property, to apply graphene to the separator 5 where the electrolyte solution must be impregnated and the lithium ion should be transferred. The graphene oxide has characteristics of an insulator and has very high electrical resistance, while the lithium ions can move easily between stacked graphene oxides.

Particularly, in the present invention, the graphene oxide is applied to the multi-layered coating layer of the separator 5 as a coating layer to adsorb lithium polysulfides generated by the reaction of sulfur from positive electrode 3 and lithium from negative electrode 1, and thus the side reaction at the surface of the negative electrode 1 caused by its shuttle effect, for example, problems of formation at the interface of a high resistance layer of $Li_2S$ generated by reaction with lithium metal or precipitation thereof at the electrode interface are solved, thereby improving the Coulomb efficiency and cycle stability of the battery.

In addition, the lithium polysulfide is constrained to the multi-layered coating layer of the separator 5, and thus the migration of the lithium polysulfide through diffusion to the negative electrode 1 is inhibited and the problem of capacity loss of sulfur generated by lithium polysulfide for the prior art is solved, and as a result, it is possible to realize a high capacity battery and to realize safety even with high loading of sulfur. In addition, as the lithium polysulfide is constrained, the separation of the positive electrode 3 from the electrochemical reaction zone is minimized.

The graphene oxide used in the present invention is slightly different from each other depending on the preparation method, but has a functional group containing oxygen on the surface or inside and various types of defects. Also, the graphene oxide contains a hydroxyl group mainly on the surface and inside according to the production method, and further contains functional groups such as a carboxyl group, a carbonyl group, an epoxy group, an ester group, an ether group, an amide group or an amino group, etc. The graphene oxide is hydrophilic due to the functional groups and thus can be dispersed in an aqueous solution or a hydrophilic solvent, and additionally peeled by applying ultrasonic waves thereto to form a platelet sheet or flake shape having very thin thickness composed of a monoatomic carbon atom layer.

Specifically, the graphene oxide has a thickness of several nm, preferably 0.5 to 100 nm, more preferably 1 to 50 nm, and a length of 0.1 to 10 μm, preferably 1 to 5 μm. Due to the thickness of several nanometers of the graphene oxide, even when several layers of the graphene oxide are laminated, there is still an advantage in maintaining the nano level thickness. Due to this thin nano level thickness, the graphene oxide has a flexible nature, is easily laminated on a porous substrate, and has good adhesion to the separator 5 due to its hydrophilic nature and thus is not easily separated during coating or during operation.

At least one layer of the graphene oxide layer containing the graphene oxide is introduced into the multi-layered coating layer, and preferably, the uppermost layer is laminated with a graphene oxide layer, which is advantageous in terms of adsorption of the polysulfides and transfer of the lithium ions. In that case, the graphene oxide layer may be applied as a single thin film of the graphene oxide layer or laminated in two or more layers, and can freely have a layer configuration preferably within a thickness range of 0.5 nm to 1 μm, and most preferably 0.5 to 50 nm.

Although the graphene oxide with these effects solves the problem caused by the lithium polysulfide, there is a new problem that the delivery rate of the lithium ions is lowered due to the nature of the platelet structure of the graphene oxide when actually applied as the separator 5.

That is, when the graphene oxide layer having nano level thickness alone is laminated on the separator 5, the graphene oxide is not stacked at a high level and does not form a sufficient level of channel so that the lithium ions can be transported, and thus the delivery of the lithium ions is not easy. In other words, when a liquid electrolyte is used, the separator 5 should be in the form of being sufficiently impregnated (humidified or wetted) in the liquid electrolyte, in order for the lithium ions to pass through the separator 5 and be transferred to the positive electrode 3 and the negative electrode 1. Since the lithium ions are difficult to pass through the graphene oxide perpendicular to its longitudinal direction, the lithium ions are transported through the lithium ion diffusion path between the stacked graphene oxide layers. In that case, when the graphene oxide layer of the platelet structure is stacked at a high density, it is not easy to secure the path, or the lithium ions are transported horizontally along the longitudinal direction and then transported through the path, and thus there is a problem that the transfer path of the lithium ions is longer than necessary and the transfer speed of the lithium ions is slowed down. The lowered transfer rate of the lithium ions causes a problem of increasing the internal impedance of the battery with the low conductivity of the lithium ions and consequently degrading the performance (i.e., specific capacity) of the battery.

Therefore, in the present invention, a multi-layered coating layer type alternately laminated with a boron nitride layer is applied in order to solve the problem caused by the use of the graphene oxide layer alone.

In order to alternately laminate with a graphene oxide layer, it is necessary to select a substance capable of facilitating the ensuring of the diffusion path of the lithium ions and at the same time increasing the conductivity of the lithium ions, without affecting the adsorption of the lithium polysulfides by the graphene oxide layer. Many inorganic or organic candidates are possible. Boron nitride was selected as the substance optimized for the above-mentioned properties.

Boron nitride (BN) is a material called white graphite and is chemically and physically similar to graphite due to the crystal structure similar to that of the graphite, but is an electrically excellent insulator. In particular, the boron nitride has an advantage that because the boron nitride has the form of a platelet sheet or flake shape like the graphene oxide, it is easily mixed with the graphene oxide and easily laminated at the time of forming the coating layer with the resultant mixture. Furthermore, the boron nitride may have a dense structure during lamination.

In particular, since the boron nitride has a thickness different from that of the graphene oxide, when the boron nitride layer is alternately laminated with the graphene oxide layer, a space for transferring the lithium ions is created in each layer due to the difference in thickness of the boron nitride layer and the lithium ions are diffused by this space, and thus the diffusion path of the lithium ions can be obtained more easily than when the graphene oxide layer alone or the boron nitride layer alone is laminated.

The boron nitride proposed in the present invention has a thickness of 0.05 to 2 μm, preferably 0.1 to 1.5 μm, more preferably 0.1 to 1.0 μm, and a length of 0.1 to 10 μm, preferably 0.5 to 7 μm, more preferably 0.2 to 5 μm.

At least one layer of boron nitride layer containing boron nitride is introduced into the multi-layered coating layer, and the boron nitride may be applied as a single thin film or laminated in two or more layers, and can freely have a layer configuration preferably within a thickness range of 0.5 to 5 μm.

By using the multi-layered coating layer obtained by alternately laminating the graphene oxide layer and the boron nitride layer, not only is it easy to secure the path through which the lithium ions are transferred, but it is also easy to transfer the lithium ions through them, and thus it is possible to sufficiently solve the problems according to the prior art occurring when the graphene oxide is used alone.

If a granular inorganic material other than a platelet structure is mixed, there is an advantage that the distance between the graphene oxide layers is increased, and thus impregnation of the electrolyte solution is relatively easy and the lithium ions are easily transferred. However, since the mixing between these two materials is not uniform, the entirety of the multi-layered coating layer is difficult to exhibit the same characteristics, and it is difficult to maintain the shape of the coating film or the attachment and adhesion ability to the porous substrate is deteriorated, making it difficult to use it as a separator 5.

In addition, the boron nitride proposed in the present invention has a small change value at high temperature and can maintain good electrical insulation when used in a battery operating in a wide temperature range. In addition, the boron nitride has high stability against organic solvents and has excellent thermal stability, and thus a crack or breakage due to temperature changes do not easily occur.

In addition, the boron nitride has the characteristics of the inorganic material itself and thus can physically inhibit the growth of the lithium dendrites generated in the negative electrode 1 by increasing the strength compared to the single coating layer of the graphene oxide.

When lithium metal is used as the negative electrode 1, non-uniformity of the electron density on the surface of the lithium metal may occur by various factors at the time of operating the battery. As a result, lithium dendrites in the form of branches are formed on the surface of the electrode, and thus protrusions are formed or grown on the surface of the electrode, so that the surface of the electrode becomes very rough. These lithium dendrites cause deterioration of the performance of the battery and, in serious cases, damage to the separator 5 and short circuit of the battery. As a result, the temperature in the battery rises and thus there is a risk of explosion and fire of the battery.

The graphene oxide layer is in the form of a nano-level thin film, and thus when used it alone, cannot effectively inhibit the growth of the lithium dendrites. However, by alternately laminating with the boron nitride layer, the strength of the coating layer itself is increased, thereby inhibiting the growth of the lithium dendrites, and even if the lithium dendrites grow, they fail to penetrate the dense structure of the fibrous network structure, and thus their growth is physically inhibited.

In addition, the graphene oxide and boron nitride used as the materials of the multi-layered coating layer according to the present invention are hydrophilic, and when a hydrophilic solvent is used as an electrolyte solution, they have high wettability thereto, thereby effectively transferring the lithium ions to the side of the lithium metal layer. Therefore, the lithium ions can be uniformly delivered to the negative electrode. As a result, the transfer of the lithium ions is effectively performed, and excellent battery characteristics are achieved without short circuit of the battery, and excellent charging/discharging properties are obtained without increasing resistance even in the case of forming a multi-layered coating layer.

In order to sufficiently ensure the above effects, the thicknesses and laminating order of the graphene oxide layer and the boron nitride layer in the multi-layered coating layer according to the present invention are limited.

The thickness of each layer of the graphene oxide layer and the boron nitride layer is as described above and they are alternately laminated and have a laminated structure of at least two layers and up to ten layers, preferably 3 to 5 layers, and more preferably 3 to 4 layers. When the multi-layered coating layer having the same thickness is formed, the multi-layered coating layer of three or more layers is more advantageous in terms of the driving of the battery than the multi-layered coating layer of two layers because the penetration of the electrolyte is easier. If the layers are laminated above the above range, since the adhesive force to the porous substrate is weaker with the increase in the number of layers, there is a possibility that the multi-layered coating layer is broken during the manufacturing process of the separator 5. In that case, the first layer in contact with the porous substrate may be any one of the graphene oxide layer and the boron nitride layer. The uppermost layer is more preferably formed of the graphene oxide layer.

The final thickness of the multi-layered coating layer having the layer structure is not particularly limited and has a range that does not increase the internal resistance of the battery while ensuring the above effects, and may be, for example, 10 nm to 100 μm, preferably 0.5 to 5 μm. If the thickness is less than the above range, it cannot perform its function as a multi-layered coating layer. On the contrary, if the above range is exceeded, stable interfacial characteristics can be imparted, but the initial interfacial resistance is increased, and thus an increase in internal resistance may be caused when manufacturing the battery.

As described above, the multi-layered coating layer can be formed on one side or both sides of the separator 5. At this time, when formed on both sides, thickness or laminating order of the graphene oxide layer and boron nitride layer may be the same or different from each other.

When each of the graphene oxide layer and the boron nitride layer is presented, the multi-layered coating layer according to the present invention exhibits an excellent effect, but may further include various additives if necessary.

As an example, in order to improve the bonding for forming a layer using the graphene oxide and the boron nitride and the adhesion to porous substrate, a binder may further be included.

The binder is not particularly limited in the present invention, and any binder that is commonly used in a lithium-sulfur battery can be used. Typically, the binder may comprise a thermoplastic resin or a thermosetting resin. For example, polyethylene, polypropylene, polytetrafluoroethylene, polyvinylidene fluoride, styrene-butadiene rubber, tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethyl vinyl ether-tetrafluoroethylene copolymer, or ethylene-acrylic acid copolymer, etc., may be used alone or in combination with each other, but is not limited thereto, and any material that can be used as a binder in the art can be used.

The binder is used in an amount of 30 parts by weight or less, preferably 1 to 20 parts by weight, based on 100 parts by weight of the total amount of the graphene oxide or boron nitride present in each layer. If the content of the binder is too high, it acts as resistance layers and the above-mentioned effects cannot be obtained.

A method of preparing the separator 5 proposed in the present invention is not particularly limited in the present invention, and a known method or various modified methods thereof can be used by a person skilled in the art.

As one method, coating solutions containing each of graphene oxide or boron nitride is prepared in a solvent, and the coating solution containing graphene oxide is coated on at least one surface of the porous substrate and then dried to form a graphene oxide layer, and thereafter a boron nitride layer is coated on the top of the graphene oxide layer with boron nitride coating solution. For multilayers, the prepared coating solutions each containing graphene oxide or boron nitride are alternately coated layer by layer and these processes are repeated several times. Reversely, the boron nitride layer is coated on at least one surface of the porous substrate and then thoroughly dried to form a boron nitride layer, and thereafter a graphene oxide layer is coated on the top of the boron nitride layer with graphene oxide coating solution. These processes are repeated to make multilayers by coating with two coating solutions alternately.

Alternatively, when a binder is used, the coating solutions may be coated on substrates and then dried to prepare a graphene oxide layer or a boron nitride layer respectively, and thereafter, the graphene oxide layer and the boron nitride layer may be transferred onto a porous substrate in multiple layers or laminated therewith to prepare the separator 5.

The solvent may be any solvent capable of sufficiently dispersing the graphene oxide and boron nitride. As an example, the solvent may be a mixed solvent of water and alcohol, or a mixture of one or more organic solvents. In that case, the alcohol may be a lower alcohol having 1 to 6 carbon atoms, preferably methanol, ethanol, propanol, isopropanol or the like. Examples of the organic solvent may include polar solvents such as acetic acid, dimethyl formamide (DMFO) and dimethyl sulfoxide (DMSO), etc., and nonpolar solvents such as acetonitrile, ethyl acetate, methyl acetate, fluoroalkane, pentane, 2,2,4-trimethylpentane, decane, cyclohexane, cyclopentane, diisobutylene, 1-pentene, 1-chlorobutane, 1-chloropentane, o-xylene, diisopropyl ether, 2-chloropropane, toluene, 1-chloropropane, chlorobenzene, benzene, diethyl ether, diethyl sulfide, chloroform, dichloromethane, 1,2-dichloroethane, aniline, diethylamine, ether, carbon tetrachloride and tetrahydrofuran (THF), etc. Preferably, water or a mixed solvent of water and a lower alcohol may be used.

The content of the solvent may be contained at a level of having such a concentration as to facilitate the coating, and the specific content varies depending on the coating method and apparatus. As an example, each of the graphene oxide and the boron nitride can be dispersed in solvents respectively, and then mixed them to prepare a coating solution. In that case, the concentration of the final coating solution is adjusted to be in the range of 0.005 to 20% by weight (solids content), and then the coating is carried out.

When a method such as transfer is used, the substrate may be a removable substrate, that is, a glass substrate or a plastic substrate. In these cases, the plastic substrate is not particularly limited in the present invention, and the plastic substrate may be formed of polyarylate, polyethyleneterephthalate, polybutyleneterephthalate, polysilane, polysiloxane, polysilazane, polyethylene, polycarbosilane, polyacrylate, poly(meth)acrylate, polymethylacrylate, polymethyl(meth)acrylate, polyethylacrylate, cyclic olefin (co)polymer, polyethyl(meth)acrylate, polypropylene, polyimide, polystyrene, polyvinylchloride, polyacetal, polyether ether ketone, polyester sulfone, polytetrafluoroethylene, poly vinylidene fluoride, or perfluoroalkyl polymer, etc.

If necessary, ultrasonic waves can be applied to the coating solution prepared for coating to achieve uniform dispersion. When the step of pulverizing by ultrasonic waves is further included, the dispersibility of the graphene oxide and boron nitride in the solution can be improved, and the coating layer having more uniform characteristics can be produced.

The coating in this step is not particularly limited, and any known wet coating method can be used. As an example, a method of uniformly dispersing using a doctor blade or the like, die casting, Comma coating, screen printing, vacuum filtration coating, and the like can be mentioned.

Then, a drying process for removing the solvent after coating is performed. The drying process is performed at a temperature and a time sufficient to sufficiently remove the solvent. The conditions may vary depending on the type of the solvent, and therefore, it is not specifically mentioned in the present invention. As an example, the drying can be carried out in a vacuum oven of 30 to 200° C., and the drying method may include drying methods such as warm-air drying, hot air drying, drying by low humidity air, or vacuum drying. The drying time is not particularly limited, but is usually in the range of 30 seconds to 24 hours.

The coating thickness of the multi-layered coating layer to be finally coated can be controlled by adjusting the concentration of the composition for forming the protection membrane or the number of times of coating according to the present invention.

In addition, the multi-layered coating layer according to the present invention has more increased strength to inhibit the growth of the lithium dendrites, or further includes an additional material for more smoothly transferring the lithium ions. Ionic conductive polymers and lithium salts may be used as the additional composition.

The ion conductive polymer is used for increasing the strength of the multi-layered coating layer or for forming the coating film of the graphene oxide and boron nitride with the binder. As a result, the growth of the lithium dendrites is physically inhibited. In addition, the transfer function of the lithium ions between the electrolyte solution and the lithium metal layer is performed by the hopping mechanism of the lithium ions due to the ionic conductivity feature.

The ion conductive polymer has a weight average molecular weight of 100 to 10,000,000 g/mol, and the kind thereof is not particularly limited in the present invention, and any polymer that is commonly used in this field can be used. As an example, the ion conductive polymer may be any one selected from the group consisting of polyethylene oxide, polypropylene oxide, polydimethylsiloxane, polyacrylonitrile, polymethyl(meth)acrylate, polyvinylchloride, polyvinylidene fluoride, polyvinylidene fluoride-co-hexafluoropropylene, polyethylene imine, polyphenylene terephthalamide, poly methoxypolyethylene glycol(meth)acrylate, poly 2-methoxyethyl glycidyl ether, and combinations thereof. Preferably, polyethylene oxide is used.

In addition, the lithium salt may be further included to enhance ionic conductivity. The lithium salt is not particularly limited in the present invention, and any lithium salt can be used as long as it can be used in all-solid-state lithium batteries of known lithium secondary batteries. Specifically, the lithium salt may be LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, lithium chloroborane, lithium lower aliphatic carboxylate, 4-phenyl lithium borate, or lithium imide, etc. Preferably, LiTFSI (Lithium bis(trifluoromethanesulfonyl)imide) represented by $(CF_3SO_2)_2NLi$ and LiFSI (fluorosulfonyl)imide represented by $(FSO_2)_2NLi$ can be used.

The ion conductive polymer and the lithium salt are preferably used in an amount of 10% by weight or less based on 100% by weight of total amount of the composition of the multi-layered coating layer.

The separator 5 having the multi-layered coating layer as described above can be suitably applied to the lithium-sulfur battery as shown in FIG. 1.

This lithium-sulfur battery solves the problems simultaneously caused by the lithium polysulfides and the lithium dendrites and thus improves problems of capacity reduction and life degradation of the lithium-sulfur battery, and not only enables the implementation of high capacity and high loading electrodes, but also improves the life characteristic, and can be applied as a lithium-sulfur battery with high stability due to no possibility of explosion and fire.

The positive electrode, negative electrode and electrolyte solution suggested in the lithium-sulfur battery will be described below.

The positive electrode has a form in which the positive electrode active material is laminated on the positive electrode current collector.

The positive electrode current collector is not particularly limited as long as it has high conductivity without causing chemical changes in the battery. For example, stainless steel, aluminum, nickel, titanium, sintered carbon; or aluminum or stainless steel surface-treated with carbon, nickel, titanium, silver or the like may be used as the positive electrode current collector.

Elemental sulfur ($S_8$), sulfur-based compounds or mixtures thereof may be included as a positive electrode active material, and they are applied in combination with a conductive material since the sulfur material alone does not have electrical conductivity. Specifically, the sulfur-based compound may be $Li_2S_n(n≥1)$, an organic sulfur compound or a carbon-sulfur polymer (($C_2S_x)_n$: x=2.5~50, n≥2), etc.

The conductive material is used to further improve the conductivity of the electrode active material. The conductive material is not particularly limited as long as it has electrical conductivity without causing chemical changes in the battery, and for example, graphite such as natural graphite or artificial graphite; carbon blacks such as carbon black, acetylene black, ketjen black, channel black, furnace black, lamp black, and summer black; conductive fibers such as carbon fiber and metal fiber; metal powders such as carbon fluoride, aluminum and nickel powder; conductive whiskers such as zinc oxide and potassium titanate; conductive metal oxides such as titanium oxide; polyphenylene derivative can be used.

The positive electrode may further include a binder for binding the positive electrode active material and the conductive material and for binding to the current collector. The binder may comprise a thermoplastic resin or a thermosetting resin. For example, polyethylene, polypropylene, polytetrafluoroethylene, polyvinylidene fluoride, styrene-butadiene rubber, tetrafluoroethylene-perfluoroalkyl vinyl ether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethyl vinyl ether-tetrafluoroethylene copolymer, and ethylene-acrylate copolymer and the like can be used alone or in combination with each other, but are not limited thereto, and any binders that can be used in the art are all possible.

The positive electrode as described above can be prepared by a conventional method. Specifically, the positive electrode can be prepared by applying a composition for forming the layer of the positive electrode active material to the current collector, drying it, and optionally compressing and molding it into a current collector to improve electrode density, wherein the composition is prepared by mixing the positive electrode active material, the conductive material and the binder in an organic solvent. In that case, as the organic solvent, it is preferable to use a solvent which can uniformly disperse a positive electrode active material, a binder and a conductive material, and which is easily evaporated. Specifically, acetonitrile, methanol, ethanol, tetrahydrofuran, water, isopropyl alcohol, and the like can be used as the organic solvent.

The negative electrode has a form in which the negative electrode active material is laminated on the negative electrode current collector. If necessary, the negative electrode current collector can be omitted.

In that case, the negative electrode current collector is not particularly limited as long as it has electrical conductivity without causing chemical changes in the battery. For example, copper, stainless steel, aluminum, nickel, titanium, sintered carbon; copper or stainless steel surface-treated with carbon, nickel, titanium, silver or the like; aluminum-cadmium alloy or the like may be used as the negative electrode current collector. In addition, the shape of the negative electrode current collector can be various forms such as a film having or not having fine irregularities on a surface, sheet, foil, net, porous body, foam, nonwoven fabric and the like.

The lithium metal layer may be lithium metal or lithium alloy. In that case, the lithium alloy contains an element capable of alloying with lithium, wherein the element may be Si, Sn, C, Pt, Ir, Ni, Cu, Ti, Na, K, Rb, Cs, Fr, Be, Mg, Ca, Sr, Sb, Pb, In, Zn, Ba, Ra, Ge, Al and alloys thereof.

The lithium metal layer may be a sheet or a foil. In some cases, the lithium metal layer may have a form in which lithium metal or lithium alloy is deposited or coated by a dry process on the current collector, or a form in which metal and alloy in the form of a particle phase are deposited or coated by a wet process or the like.

The electrolyte solution of the lithium secondary battery is a lithium salt-containing electrolyte solution, which may be an aqueous or non-aqueous electrolyte solution, preferably a non-aqueous electrolyte comprising an electrolyte solution and a lithium salt in an organic solvent. Additionally, organic solid electrolytes, inorganic solid electrolytes, or the like may be included, but is not limited thereto.

The non-aqueous organic solvent may include, for example, aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxyfranc, 2-methyl tetrahydrofuran, dimethyl sulfoxide, 1,3-dioxolane, 4-methyl-1,3-dioxene, diethyl ether, formamide, dimethylformamide, acetonitrile, nitromethane, methyl formate, methyl acetate, triester phosphate, trimethoxymethane, dioxolane derivatives, sulfolane, methyl sulfolane, 1,3-dimethyl-2-imidazolidinone, propylene carbonate derivatives, tetrahydrofuran derivatives, ethers, methyl propionate, ethyl propionate and the like.

In that case, an ether-based solvent is used as the non-aqueous solvent, so as to be similar to the electrode protection layer of the present invention. Examples of the solvent include tetrahydrofuran, ethylene oxide, 1,3-dioxolane, 3,5-dimethyl isoxazole, 2,5-dimethyfuran, furan, 2-methylfuran, 1,4-oxane, 4-methyl dioxolane and the like.

The lithium salt is a substance which is easily soluble in the non-aqueous electrolyte. The lithium salt may be LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, lithium chloroborane, lithium lower aliphatic carboxylate, 4-phenyl lithium borate, or lithium imide, etc.

The shape of the lithium-sulfur battery 10 as described above is not particularly limited and may be, for example, a jelly-roll type, a stack type, a stack-folding type (including a stack-Z-folding type), or a lamination-stacking type, and preferably a stack-folding type.

An electrode assembly in which the positive electrode 3, the separator 5, and the negative electrode 1 are successively laminated is manufactured and then placed it in a battery case. Thereafter, a lithium-sulfur battery 10 is manufactured by injecting an electrolyte solution into the upper part of the case and sealing it with a cap plate and a gasket.

The lithium-sulfur battery 10 may be classified into a cylindrical shape, a square shape, a coin shape, a pouch shape, and the like depending on the shape, and may be divided into a bulk type and a thin film type depending on the size. The structure and manufacturing method of these batteries are well known in the art, and thus detailed description thereof will be omitted.

The lithium-sulfur battery 10 according to the present invention is a high-capacity and high-loading battery and can be used as a power source for devices requiring such characteristics. Specified examples of the devices may include, but is not limited to, a power tool powered by an electric motor; an electric vehicle including an electric vehicle (EV), a hybrid electric vehicle (HEV), a plug-in hybrid electric vehicle (PHEV) and the like; an electric motorcycle including an electric bike (E-bike) and an electric scooter (E-scooter); an electric golf cart; a power storage system, etc.

MODE FOR INVENTION

Hereinafter, Examples, Comparative Examples and Experimental Example will be described to help understand the effects of the present invention. However, the following description is only an example of the contents and effects of the present invention, and the scope and effect of the present invention are not limited thereto.

EXAMPLES

Example 1

(1) Preparation of Separator

16 μm of polypropylene (50% porosity) film was prepared as a porous substrate.

Ultrasonic waves were applied to an aqueous dispersion of graphene oxide (concentration of 0.01 wt %, thickness of 2 to 5 nm, length of 2 to 5 μm) for 12 hours to prepare the first coating solution, and ultrasonic waves were applied to an aqueous dispersion of boron nitride (concentration of 0.1 mg/mL, thickness of 0.2 to 0.5 μm, length of 1 to 5 μm) for 8 hours to prepare the second coating solution.

The first coating solution was poured on the porous substrate and then filtered under reduced pressure to form a graphene oxide layer on the porous substrate. The second coating solution was poured again on the formed graphene oxide layer, and then filtered under reduced pressure to form a boron nitride layer on the graphene oxide layer. Again, the first coating solution was poured and then filtered under reduced pressure, and thereafter, dried at 70° C. for 24 hours to prepare a separator having a multi-layered structure of a graphene oxide layer/a boron nitride layer/a graphene oxide layer (total thickness: about 2.5±0.5 μm). At this time, the graphene oxide layer was laminated in a thickness of about 10 nm to 20 nm.

(2) Lithium-Sulfur Battery

The conductive carbon having electric conductivity and sulfur were mixed through a ball mill process in a conductive carbon:sulfur weight ratio (wt %) of 30:70 (21 g: 49 g) to obtain a sulfur-carbon complex. A slurry of the positive electrode active material was prepared by using a composition composed of 70.0 g of positive electrode active material containing the complex, 20.0 g of Super-P as a conductive material, 10.0 g of polyvinylidene fluoride as a binder and 500 g of N-methyl-2-pyrrolidone as a solvent, based on the total weight of the slurry of the positive electrode active material, and then coated on an aluminum current collector to prepare a positive electrode active portion.

A lithium-sulfur battery was prepared using a lithium foil having a thickness of about 40 μm as a negative electrode, together with the positive electrode, using a mixed solution of dimethoxyethane:dioxolane (1:1 by volume) as an electrolyte solution, in which 1 M of $LiN(CF_3SO_2)_2$ was dissolved, and using the separator prepared above.

Example 2

The same procedure as in Example 1 was performed to prepare a separator having a multi-layered coating layer (total thickness: about 2.5±0.5 μm) which has a 4 layers structure of a graphene oxide layer/a boron nitride layer/a graphene oxide layer/a boron nitride layer and to prepare a lithium-sulfur battery comprising the same, except that the second coating liquid was further used to form a further boron nitride layer.

Example 3

The same procedure as in Example 1 was performed to prepare a separator having a multi-layered coating layer (total thickness: about 2.5±0.5 μm) which has a 3 layers structure of a boron nitride layer/a graphene oxide/a boron nitride layer, and to prepare a lithium-sulfur battery comprising the same, except that the order of coating of the first coating liquid and the second coating liquid was different.

Comparative Example 1

A lithium-sulfur battery was prepared in the same procedure as in Example 1 except that the coating layer is not formed, and the porous substrate is used, as it is, as a separator.

Comparative Example 2

A lithium-sulfur battery was prepared in the same procedure as in Example 1 except that graphene oxide is used alone as the coating layer.

Experimental Example 1

The lithium-sulfur batteries manufactured in the above Example and Comparative Examples were driven under the conditions of 0.3 C/0.5 C charging/discharging, the initial charging/discharging capacity was measured and the capacity change was confirmed by performing 200 cycles.

Figure 2:
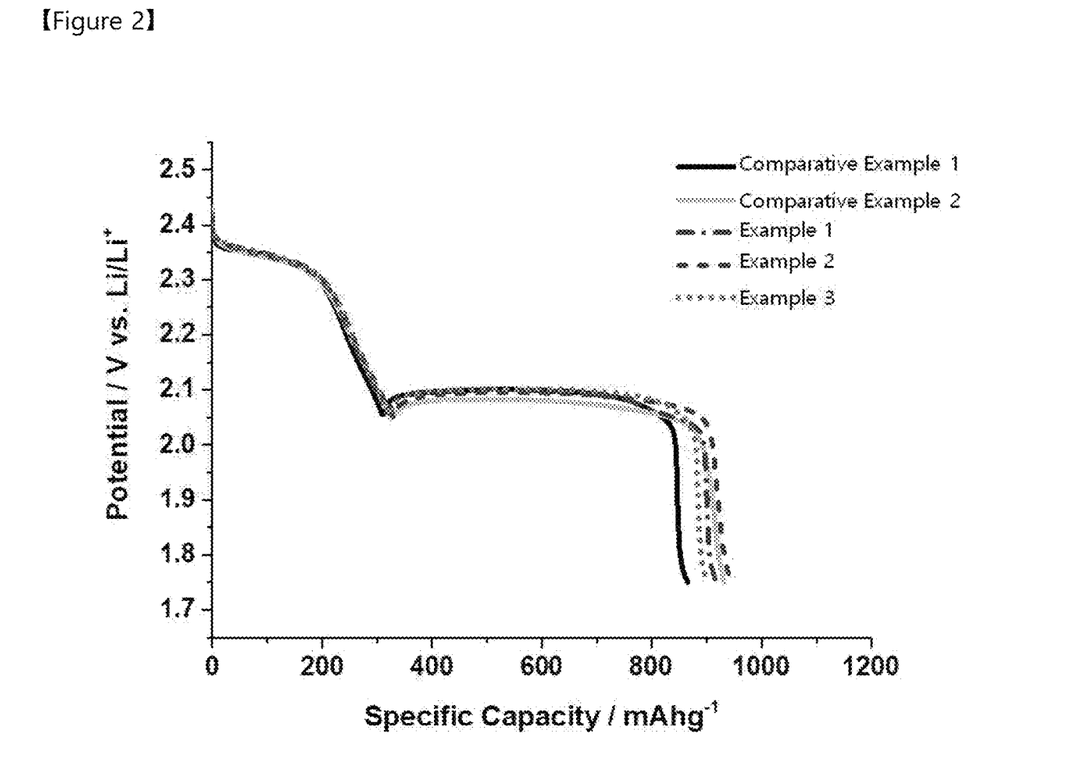
FIG. 2 is the initial charging/discharging capacities graph of the lithium-sulfur batteries manufactured in Examples 1 to 3 and Comparative Examples 1 and 2.

FIG. 2 is a graph showing the initial discharge capacities of the lithium-sulfur batteries manufactured in Examples 1 to 3 and Comparative Examples 1 and 2. Referring to FIG. 2, it can be seen that the batteries of Examples 1 to 3 having the multi-layered coating layer according to the present invention have a high initial discharge capacity, as compared to Comparative Example 1 without the multi-layered coating layer.

Figure 3:
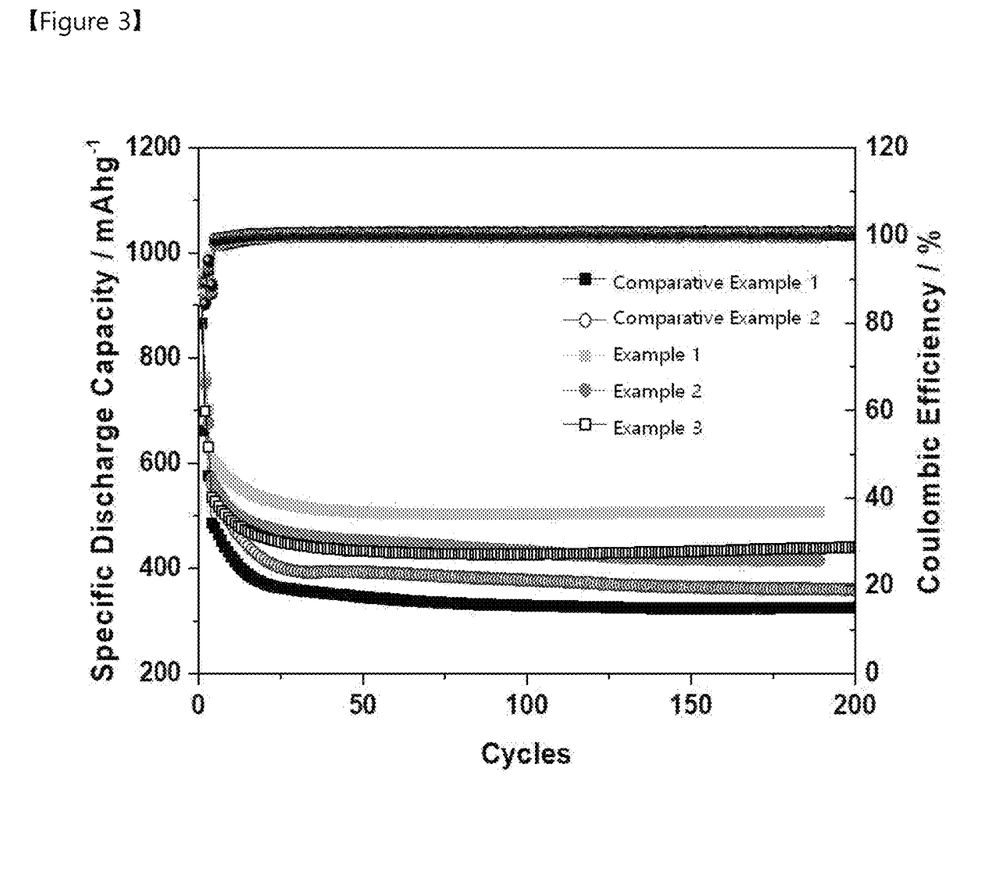
FIG. 3 is the life characteristics graph of the lithium-sulfur batteries manufactured in Examples 1 to 3 and Comparative Examples 1 and 2.

FIG. 3 is graph showing the life characteristics of the lithium-sulfur batteries manufactured in Examples 1 to 3 and Comparative Examples 1 and 2. Referring to FIG. 3, it can be seen that the batteries of Examples 1 to 3 showed a high capacity retention ratio relative to the initial charging/discharging and the capacity improvement effect and did not generate a short circuit during 200 cycles, and thus is superior to the cell of Comparative Example 1 in life characteristics.

From these results, it can be seen that due to the multi-layered coating layer proposed in the present invention, when lithium-sulfur battery is driven, the lithium polysulfides are adsorbed and the growth of the lithium dendrites is suppressed, thereby achieving high initial charging/discharging capacity characteristics and excellent life characteristics.

DESCRIPTION OF SYMBOLS

10: lithium-sulfur battery
1: negative electrode
3: positive electrode
5: separator

The invention claimed is:

1. A separator for a lithium-sulfur battery, comprising:
a porous substrate; and
a multi-layered coating layer formed on at least one side of the porous substrate, wherein the multi-layered coating layer comprises a graphene oxide layer and a boron nitride layer,
wherein the coating layer further comprises at least one selected from the group consisting of a binder, an ion conductive polymer, and a lithium salt.

2. The separator for a lithium-sulfur battery of claim 1, wherein the porous substrate has a thickness of 3 to 100 μm and a pore size of 0.1 to 10 μm.

3. The separator for a lithium-sulfur battery of claim 1, wherein the porous substrate includes at least one material selected from the group consisting of polyethylene, polypropylene, polyethyleneterephthalate, polybutyleneterephthalate, polyamide, polyacetal, polycarbonate, polyimide, polyether ketone, polyethersulfone, polyphenylene oxide, polyphenylenesulfide, polyethylene naphthalene, polytetrafluoroethylene, polyvinylidene fluoride, polyvinylchloride, polyacrylonitrile, cellulose, nylon, polyparaphenylene benzobisoxazole and a polyarylate.

4. The separator for a lithium-sulfur battery of claim 1, wherein the multi-layered coating layer has a total thickness of 10 nm to 100 μm.

5. The separator for a lithium-sulfur battery of claim 1, wherein the multi-layered coating layer has a total number of layers of the graphene oxide layer and the boron nitride layer of 2 to 10.

6. The separator for a lithium-sulfur battery of claim 1, wherein a thickness of an individual graphene oxide layer is 0.5 nm to 1 μm.

7. The separator for a lithium-sulfur battery according to claim 1, wherein graphene oxide present in the graphene oxide layer has a platelet sheet or flake shape with a thickness of 0.5 to 100 nm and a length of 0.1 to 10 μm.

8. The separator for a lithium-sulfur battery of 1, wherein a thickness of an individual boron nitride layer is 0.5 to 5 μm.

9. The separator for a lithium-sulfur battery according to claim 1, wherein boron nitride present in the boron nitride layer has a platelet sheet or flake shape with a thickness of 0.05 to 2 μm and a length of 0.1 to 10 μm.

10. The separator for a lithium-sulfur battery of claim 1, wherein an uppermost layer of the multi-layered coating layer is a graphene oxide layer.

11. A lithium-sulfur battery comprising the separator of claim 1.

12. The separator for a lithium-sulfur battery of claim 1, wherein the multi-layered coating layer is formed by alternately laminating the graphene oxide layer and the boron nitride layer.

* * * * *